Nov. 7, 1939. B. E. SIBLEY 2,178,816
GREASE-DISPENSING DEVICE
Filed July 21, 1937
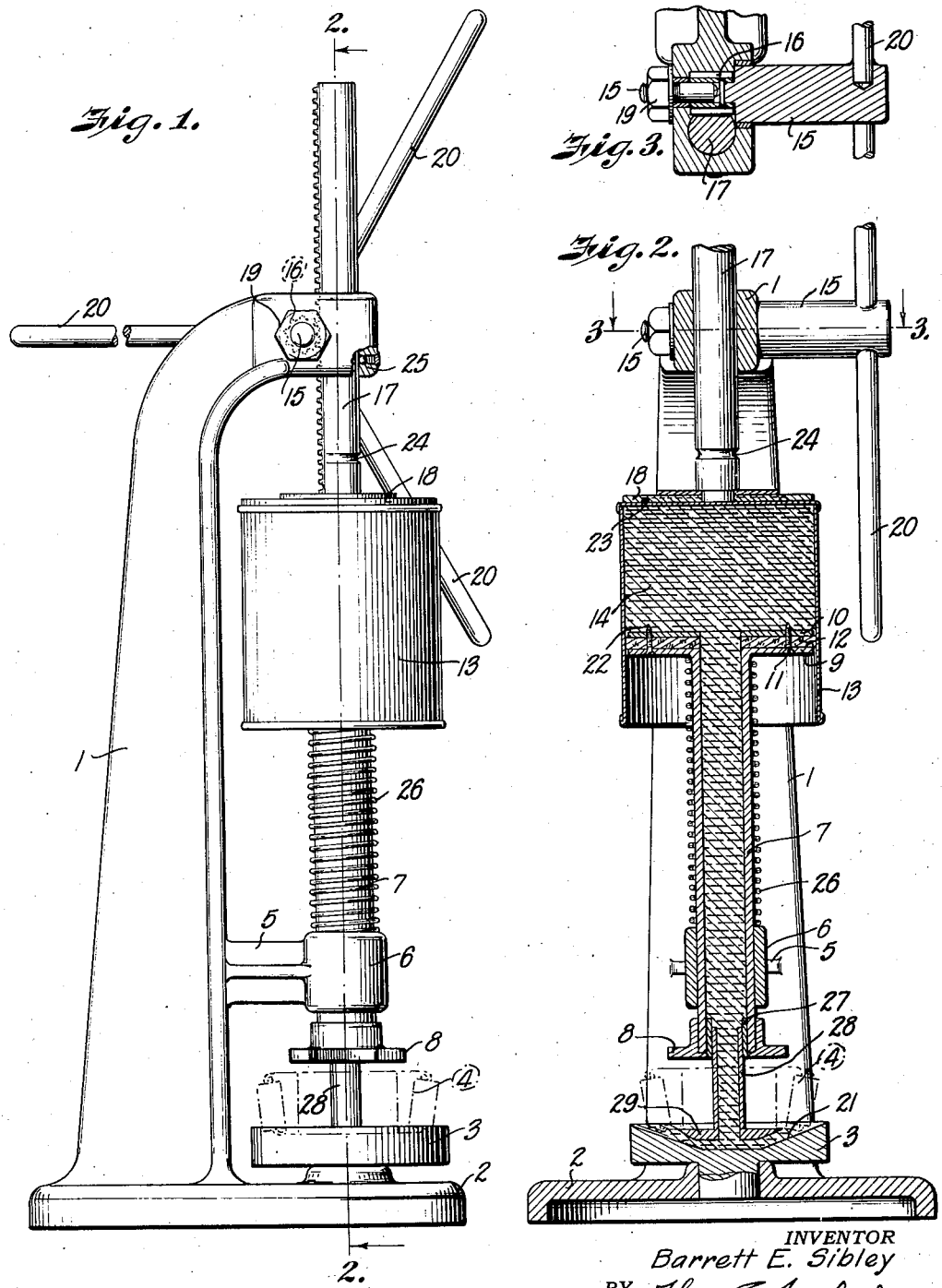
INVENTOR
Barrett E. Sibley
BY Thos. E. Scofield
ATTORNEY Patented Nov. 7, 1939

2,178,816

UNITED STATES PATENT OFFICE 2,178,816

GREASE-DISPENSING DEVICE

Barrett E. Sibley, Ponca City, Okla., assignor to Continental Oil Company, Ponca City, Okla., a corporation of Delaware Application July 21, 1937, Serial No. 154,811

5 Claims. (Cl. 184—1)

My invention relates to a grease dispensing device and more particularly to a device for dispensing grease from containers.

Currently, it is the custom to pack greases in cans. Various parts of automobiles are designed to be lubricated with various lubricants and greases. Due to the large variety of greases employed, they are packed in individual containers or cans. A special grease is supplied for packing ball bearings and roller bearings. These are difficult to pack with grease and, when packed by hand, much grease is wasted.

One object of my invention is to provide a dispensing device for dispensing grease from containers.

Another object of my invention is to provide a device for packing bearings with grease.

Other and further objects of my invention will appear from the following description.

In the accompanying drawing which forms part of the instant specification and is to be read in conjunction therewith, and in which like reference numerals are used to indicate like parts in the various views;

Figure 1 is an elevation of my grease dispensing device with a grease container in grease dispensing position.

Figure 2 is a sectional elevation along the line 2—2 of Figure 1.

Figure 3 is a sectional view taken along the line 3—3 of Figure 2.

In general, my invention contemplates the provision of a piston provided with a hollow piston rod. The piston is adapted to fit in a can of grease. The piston rod is slidably supported in a bearing secured to a stand. The upper portion of the stand is provided with a pressure exerting means adapted to push the can of grease against the piston. The piston rod is hollow so that greast will flow out through the piston rod. The bottom of the standard is provided with a support for the bearing to be packed, in conjunction with which piston rod extension members are provided for use with various sized bearings being packed.

More particularly referring now to the drawing, a standard 1 is formed with a base 2 on which is mounted a seat 3 adapted to support a bearing 4 which is to be packed with grease. An arm 5 carries a bearing 6 in which a hollow piston rod 7 is adapted to slide. The lower end of the piston rod 7 is adapted to receive a bushing 27 in which bushing a mushroom shaped member is adapted to slide. The mushroom member comprises a stem 28 of an external diameter fitted to the internal diameter of the bushing 27 and a head 29 which is flat on top and sloped on the bottom as can readily be seen by reference to Figure 2. A plurality of mushroom members are supplied, depending upon the size of the bearing to be packed. The lower end of the piston rod 7 is also provided with a star shaped contact flange 8 to enable observation of smaller sized bearings. The upper end of the piston rod 7 carries a piston 9. Between the bearing 6 and the piston 9 I provide a spring 26 holding the piston in its uppermost position when the device is not in use. Secured to the piston 9 by means of plate 10 and screws 11 is a packing member 12 which is adapted to seal against the interior walls of the grease container 13 which is filled with grease 14. The screws 11 are longer than necessary and are provided with sharp projecting ends 22 adapted to pierce the bottom of the grease container 13 when the grease has been exhausted. This prevents further use of the can and also provides vents enabling ready removal of the empty can. The upper end of standard 1 is provided with a bore in which is journalled a shaft 15. Secured to the shaft 15 is a pinion 16 adapted to mesh with a rack 17. The rack is mounted for longitudinal movement with the standard 1 and carries a flange 18 at its lower end. The under side of the flange 18 is provided with an annular groove 23 of sufficient depth and in such a position as to enable projections 22 to puncture the bottom of the can 13. A nut 19 prevents movement of the shaft 15 out of the standard journal. A plurality of operating arms 20 are provided for rotating the shaft 15. The rack 17 is provided with a groove 24. A spring pressed ball 25 is provided in the standard, adapted to act as a detent by engagement with groove 24 to hold the rack in the upper position enabling the insertion of a new can of grease conveniently. In operation, the rack 17 is raised with spring pressed ball 25 engaging groove 24. A can of grease is opened and inverted over the piston 9 and manually pressed downwardy by hand to start the grease through the hollow piston rod.

The operating arms 20 are then operated to move the rack downwardly to permit flange plate 18 to engage the bottom of the can, the spring 26 holding the assembly in the uppermost position. A proper sized mushroom is taken, depending upon the particular size of bearing to be packed. The mushroom stem 28 is inserted upwardly through the bearing with the projecting end of the inner race of the bearing upwardly.

The stem 28 is inserted in the bushing. The rack operating handles are then operated to lower the piston until star shaped contact flange 8 makes contact with the projecting end of the inner race. Continued movement of the rack will force the can of grease against the piston, forcing grease downwardly through the hollow piston, downwardly through the hollow mushroom stem between the seat 3 and the mushroom flange, upwardly through the passages between the retainer and the inner race. The diameter of the mushroom flange is such that grease will not flow through the bore of the bearing.

When all the grease in the can has been consumed, the projections 22 will pierce the bottom of the can, permitting easy withdrawal of the can.

The grease, in passing between the retainer and the inner race, pushes the old lubricant ahead, thus effectually cleaning the bearing of old grease. At the same time, all the interstices between the balls or rollers and all passages are completely filled with new, clean lubricant. Upon removal of the inner race of the retainer assembly, the bearing is ready to be reassembled and placed in operation.

It will be seen that I have accomplished the objects of my invention. I have provided a novel grease dispensing device which is adapted to be used for packing of ball roller bearings with grease in a simple and expeditious manner.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a device adapted to dispense grease from a container, a standard, a bearing mounted on said standard, a hollow piston rod slidably supported in said bearing, a seat for the article to be packed with grease positioned coaxially with said hollow piston rod, means adapted to contact the article to be packed carried by one end of said hollow piston rod, a piston carried by the other end of said piston rod, adapted to enter a can of grease, said piston being provided with means for conducting grease from in front of the piston into said hollow piston rod, and means for causing a can of grease to move relative to said piston to eject grease therefrom for passage through said hollow piston rod.

2. In a grease dispensing device, a standard having a base, a seat mounted on said base for supporting an article to be packed with grease, the upper end of said standard being provided with an arm, a bearing carried by said arm in alignment with said seat, a rack positioned in said bearing, means for operating said rack, a plate carried by the lower end of said rack adapted to contact the bottom of the can of grease, a second arm carried by said standard, a second bearing supported by said second arm, said second bearing being in substantial alignment with said first bearing and said seat, a hollow piston rod carried in said second bearing, a sealing member carried by the lower end of said hollow piston member adapted to sealingly seat against an article adapted to be packed with grease, a piston carried by the other end of said piston rod adapted to enter a can of grease and means for permitting the passage of grease from in front of the piston into said hollow piston rod.

3. In a device for packing bearings with grease, a seat for supporting the bearings to be packed, a hollow piston rod slidably mounted above said seat, means carried by the lower end of said piston rod adapted to sealingly contact the bearing to be packed, a piston carried by the upper end of said piston rod, said piston being adapted to enter a can of grease and being provided with an opening for the passage of grease from a container into said hollow piston rod, and means for relatively moving a container of grease with respect to said piston to force the ejection of grease from said container through said hollow piston rod to the article to be packed.

4. In a device for packing bearings with grease, a seat for supporting the bearings to be packed, a hollow piston rod slidably mounted above said seat, a piston rod extension having one end adapted to be supported by said seat and having the other end telescoped within said hollow piston rod, said extension extending through the bearing to be packed, means carried by the lower end of said piston rod adapted to sealingly contact the bearing to be packed, a piston carried by the upper end of said piston rod, said piston being adapted to enter a can of grease and being provided with an opening for the passage of grease from a container into said hollow piston rod, and means for relatively moving a container of grease with respect to said piston to force the ejection of grease from said container through said hollow piston rod to the bearing to be packed.

5. In a grease dispensing device, a standard having a base, a seat on said base for supporting an article to be packed with grease, the upper end of said standard being provided with a bracket, a bearing carried by said bracket in alignment with said seat, a rack positioned in said bearing, means for operating said rack, a plate carried by the lower end of said rack adapted to contact the bottom of the can of grease, a second bracket carried by said standard, a bearing supported by said second bracket, said second bearing being in substantial alignment with said first bearing and said seat, a hollow piston rod carried in said second bearing, a member carried by the lower end of said hollow piston rod adapted to seat against an article to be packed with grease, a piston carried by the other end of said piston rod adapted to enter a can of grease, a spring extending between said second bearing and said piston rod, means for permitting the passage of grease from in front of the piston into said hollow piston rod, and a projection from the upper surface of said piston rod adapted to puncture the bottom of a can of grease when the piston has emptied the can of grease.

BARRETT E. SIBLEY.